US012263505B2

(12) United States Patent
Hedrick

(10) Patent No.: US 12,263,505 B2
(45) Date of Patent: Apr. 1, 2025

(54) COATING APPLICATOR

(71) Applicant: RRC, LLC, Mt. Sterling, IA (US)

(72) Inventor: Chad Hedrick, Mt. Sterling, IA (US)

(73) Assignee: RRC, LLC, Mt. Sterling, IA (US)

( * ) Notice: Subject to any disclaimer, the term of this patent is extended or adjusted under 35 U.S.C. 154(b) by 0 days.

(21) Appl. No.: 18/086,213

(22) Filed: Dec. 21, 2022

(65) Prior Publication Data

US 2023/0128261 A1 Apr. 27, 2023

Related U.S. Application Data

(63) Continuation of application No. 16/417,632, filed on May 20, 2019, now Pat. No. 11,534,793.

(60) Provisional application No. 62/673,474, filed on May 18, 2018.

(51) Int. Cl.

| | |
|---|---|
| ***B05B 13/04*** | (2006.01) |
| ***B05B 13/00*** | (2006.01) |
| ***B05D 1/02*** | (2006.01) |
| ***B05D 5/00*** | (2006.01) |
| ***E04D 15/00*** | (2006.01) |

(52) U.S. Cl.

CPC .............. *B05D 1/02* (2013.01); *B05B 13/005* (2013.01); *B05B 13/0452* (2013.01); *B05D 5/00* (2013.01); *E04D 15/00* (2013.01)

(58) Field of Classification Search

None

See application file for complete search history.

(56) References Cited

U.S. PATENT DOCUMENTS 6,981,657 B1 * 1/2006 West ..................... B05B 13/005 239/69

2005/0013942 A1 * 1/2005 Rich ..................... B05B 13/005 118/308

OTHER PUBLICATIONS https://www.youtube.com/watch?v=NW6v5aUA264 (Apr. 2013); SprayWorks Equipment.* https://www.youtube.com/watch?v=Pz4bNdxqXLM (Oct. 2017); SprayWorks Equipment.* https://www.youtube.com/watch?v=ORIzbKVLIwY (Jun. 2011); SprayWorks Equipment.*

* cited by examiner

*Primary Examiner* — Michael P. Rodriguez

(74) *Attorney, Agent, or Firm* — Hamilton IP Law, PC.; Jay R. Hamilton

(57) ABSTRACT

An applicator and method of use is disclosed for applying coatings and paints to various surfaces. As shown, the sprayer may have an undercarriage frame that supports three-wheels. All three wheels may run parallel with the first wheels and second wheels attached to the sprayer frame via an undercarriage with the third wheel positioned behind and between both the first and second wheels on a separate arm or frame. The width of the sprayer booms may be adjusted. The undercarriage may be folded entirely or only a portion therein. The arm of the third wheel may be folded or telescope, as required by a particular application. A handle, which may be adjustable, may be positioned between the sprayer frame and the undercarriage. Use of the applicator according to the method discussed herein reduces operator fall exposure and increases application efficiency.

25 Claims, 20 Drawing Sheets

COATING APPLICATOR

CROSS REFERENCE TO RELATED APPLICATIONS

This application claims priority from non-provisional U.S. patent application Ser. No. 16/417,632 filed on May 20, 2019 (issued as U.S. Pat. No. 11,534,793 on Dec. 27, 2022), which claimed priority from provisional U.S. Pat. App. No. 62/673,474 filed on May 18, 2018, all of which are incorporated by reference herein in their entireties.

FIELD OF THE INVENTION

The present disclosure relates to an applicator which may be particularly useful for applying and spraying paint and other coatings on to surfaces as well as the methods of using the applicator to apply coatings to the roofs and as well as other spaces. In one exemplary application, the surface to be painted or coated is a corrugated steel roof, without limitation and/or restriction, as shown and disclosed herein.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

The present disclosure relates to methods and apparatus for applying coatings, such as silicone, and paints to surfaces including flat horizontal steel or aluminum roofs. To prevent corrosion and improve appearance buildings having corrugated type roofs typically require painting or coating every 10-15 years. Typically, this work is done in warmer weather and in relatively dry, wind free conditions. In the prior art an operator may apply paint or coatings by manual application via a roller. Commercial operators typically use a pressurizing (motorized pump) paint system located on the ground adjacent a building roof to be painted, connect the paint system to a hose, then run the hose up to a single boom with a spray tip end. Paint and or coatings are applied by the operator going up on the roof and running the boom and spray tip back and forth along the roof surface until it is fully covered. Both manual application with a roller and semi-manual application with a pressurized system involve intensive labor as the operator must handle either the roller or the boom during paint or coating application thus fatiguing the operator and many times exposing the operator to lower back pain and injury due to overuse.

As such, there is a high value placed by operators of painting and coating businesses on efficient and consistent application of coatings with faster methods improving profitability. At the same time, due to the inherent risk of applying paint and coatings upon the roof of a building, it is important to do this in the safest manner possible as painting or coating roofs exposes operators to the risk of falling. Further, there is a need to reduce back pain and fatigue.

Research and experience using the applicator and the methods disclosed herein have shown that at least one embodiment of the applicator and method of using same as disclosed herein significantly reduced labor hours and efforts resulting in better application of the paint or coatings applied with reduced fatigue and potential for injury to operators over prior art devices and/or hand application. The advantages of the invention herein include weight reduction, improved transportability, safety and efficiency, all of which are valued by operators of painting and coating business. The invention as disclosed reduces operator effort over hand application while improving coating consistency by maintaining the distance between the nozzle tips and the roof or application surface. The unique design of the invention allows the operator to roll the applicator back and forward without the operator changing position in relation to the applicator.

As will be discussed further herein, this improves operator safety as an operator using the applicator and the methods disclosed herein should significantly reduce and or eliminate having his "back" to the edge of the roof thereby decreasing the potential of falling off the roof due to overstepping the edge. The relatively light, compact design is light and thereby easy to get onto the roof. Further, the applicator with slidable boom allows the applicator to be asymmetrically configured (i.e. boom to right or boom to left), but still balanced and stable, for forward and reverse motion for a single operator position. The light compact design is a desirable as it may be placed into a compact transport mode decreasing space used in packing it up and decreasing awkwardness in moving onto or off of a roof.

DETAILED DESCRIPTION—BRIEF DESCRIPTION OF DRAWINGS

Figure 1:
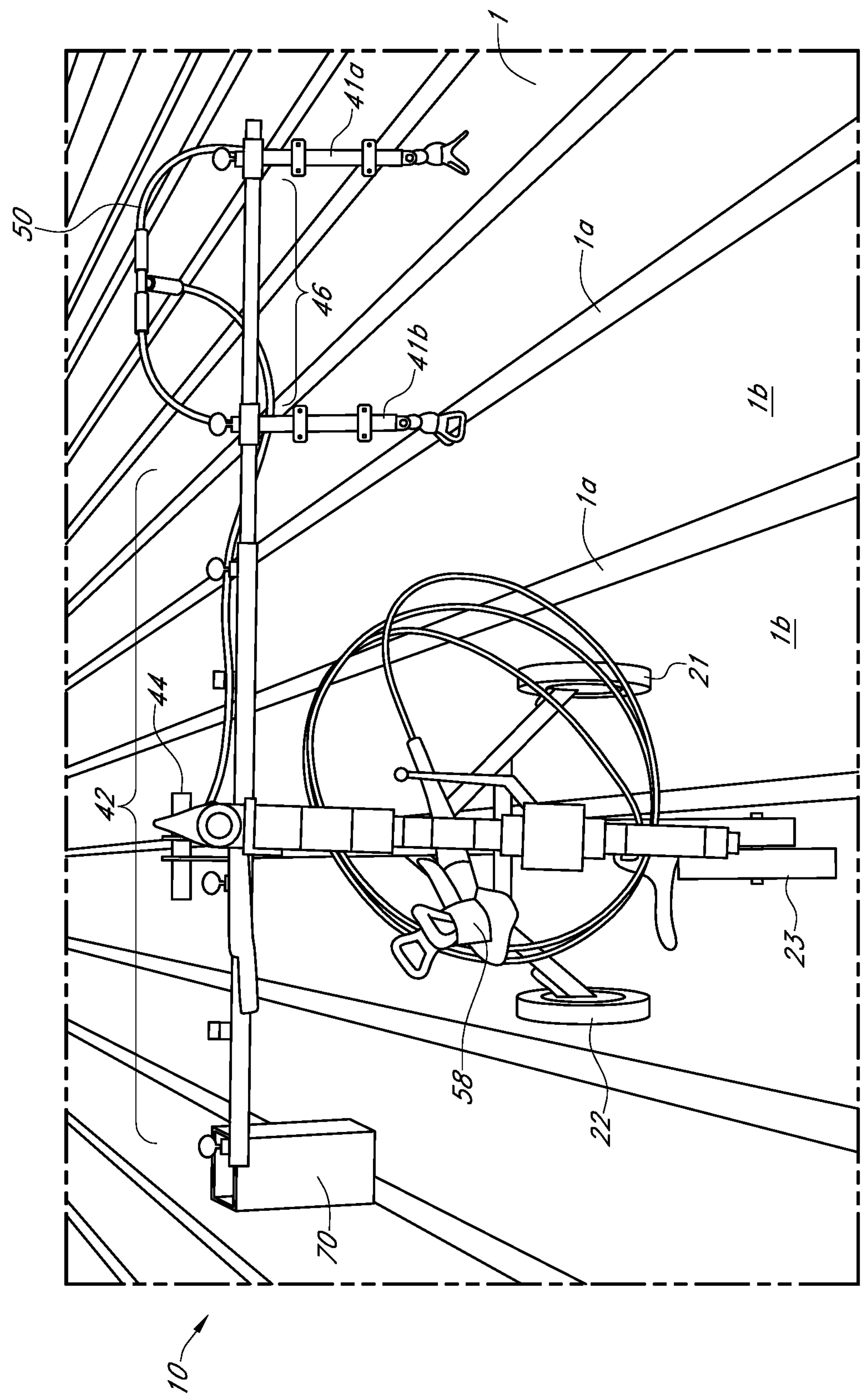
FIG. 1 is a rear view of a coating applicator wherein the boom is offset to the right side of the applicator in relation to the operator as shown and disclosed herein.

Appendix A and B are included herein and provide additional inventor disclosures such as a marketing brochure, user's manual and additional photographs for implementation, as provided by the inventor for inclusion herein, and may be claimed in whole or in part, for its use in the implementation of the present disclosure and is fully incorporated by reference herein.

DETAILED DESCRIPTION—TABLE OF ELEMENTS

| Element Description | Element Number |
|---|---|
| Surface | 1 |
| Ridge(s) | 1a |
| Groove(s) | 1b |
| Coating | 2 |
| Operator | 3 |
| | 4 |
| | 5 |
| | 6 |
| | 7 |
| Coating applicator | 10 |
| Carriage | 20 |
| Wheel (first) | 21 |
| Wheel (second) | 22 |
| Wheel (third) | 23 |
| Center leg | 24 |
| First leg | 25 |
| Second leg | 26 |
| Center strut | 27 |
| Third leg | 28 |
| | 29 |
| Center support assembly | 30 |
| | 32 |
| Handle slot | 34 |
| | 36 |
| Wheel slot | 38 |
| Boom | 40 |
| Down leg(s) | 41 |
| Down leg-first | 41a |
| Down leg-second | 41b |
| Center section | 42 |
| Pin hole | 43 |
| Support handle | 44 |
| First section (slidable) | 46 |
| Second section (slidable) | 48 |
| Fluid delivery arrangement | 50 |
| Input coupling | 52 |
| Fluid conduit (hose) | 54 |
| Nozzle | 56 |
| Ball valve | 57 |
| Detail gun | 58 |
| Handle | 60 |
| Transport handle | 61 |
| Brake | 62 |
| Counterweight | 70 |
| Locking pin | 80 |
| Standing Seam Roof (SSR) | 100 |
| First area | 101 |
| Second area | 102 |
| Rib | 103 |
| Eve | 104 |
| Edge | 105 |
| Panel | 106 |

DETAILED DESCRIPTION OF INVENTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes ¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description.

Before the various embodiments of the present invention are explained in detail, it is to be understood that the invention is not limited in its application to the details of construction and the arrangements of components set forth in the following description. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

The following detailed description is of the best currently contemplated modes of carrying out illustrative embodiments of the invention. The description is not to be taken in a limiting sense but is made merely for the purpose of illustrating the general principles of the invention, since the scope of the invention is best defined by the appending claims. Various inventive features are described below herein that can each be used independently of one another or in combination with other features.

ILLUSTRATIVE EMBODIMENT AND ADVANTAGES OF INVENTION

Figure 2:
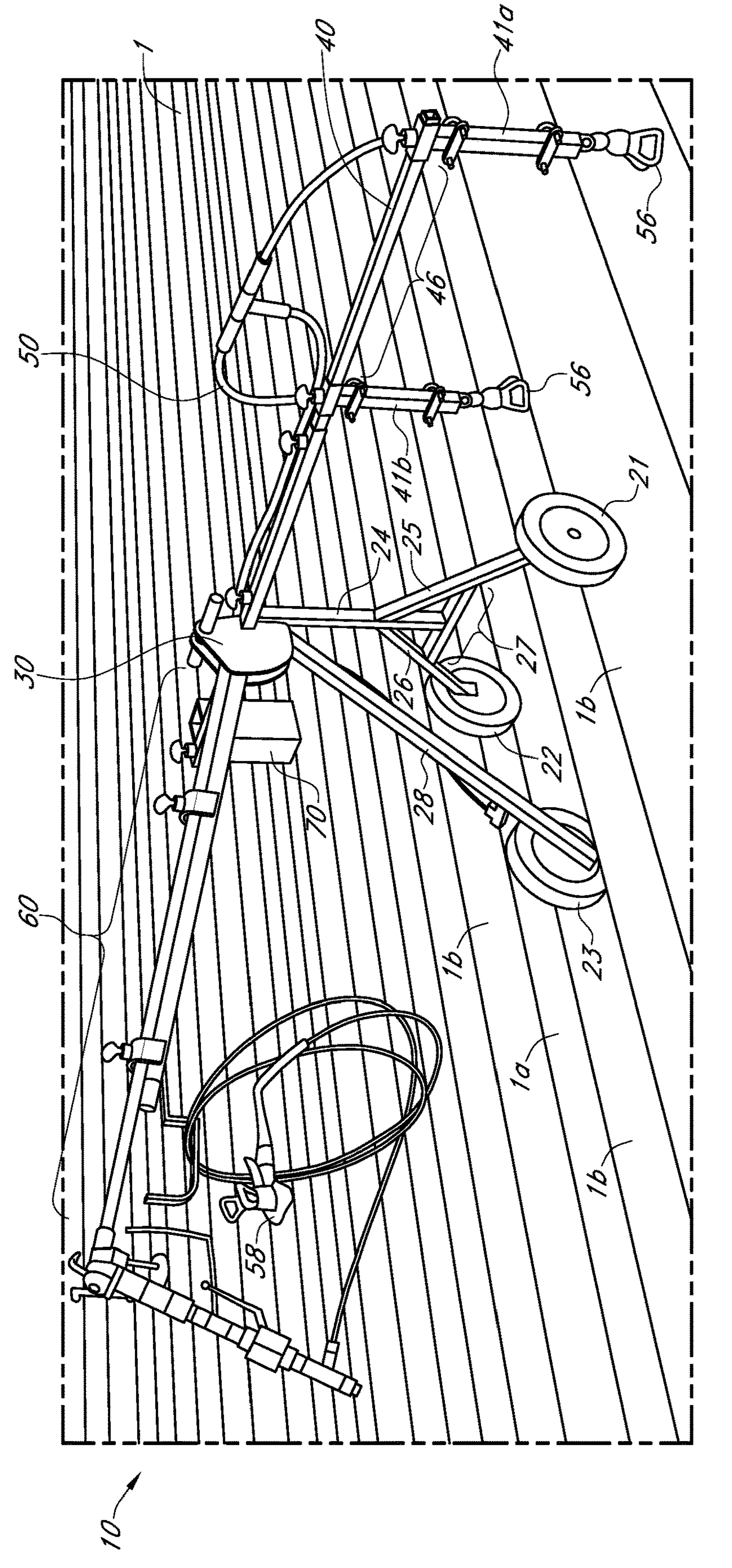
FIG. 2 is a perspective view at 45 degrees to the right of the view as shown in FIG. 2 providing additional detail of the carriage, the center support assembly and the boom.
Figure 3:
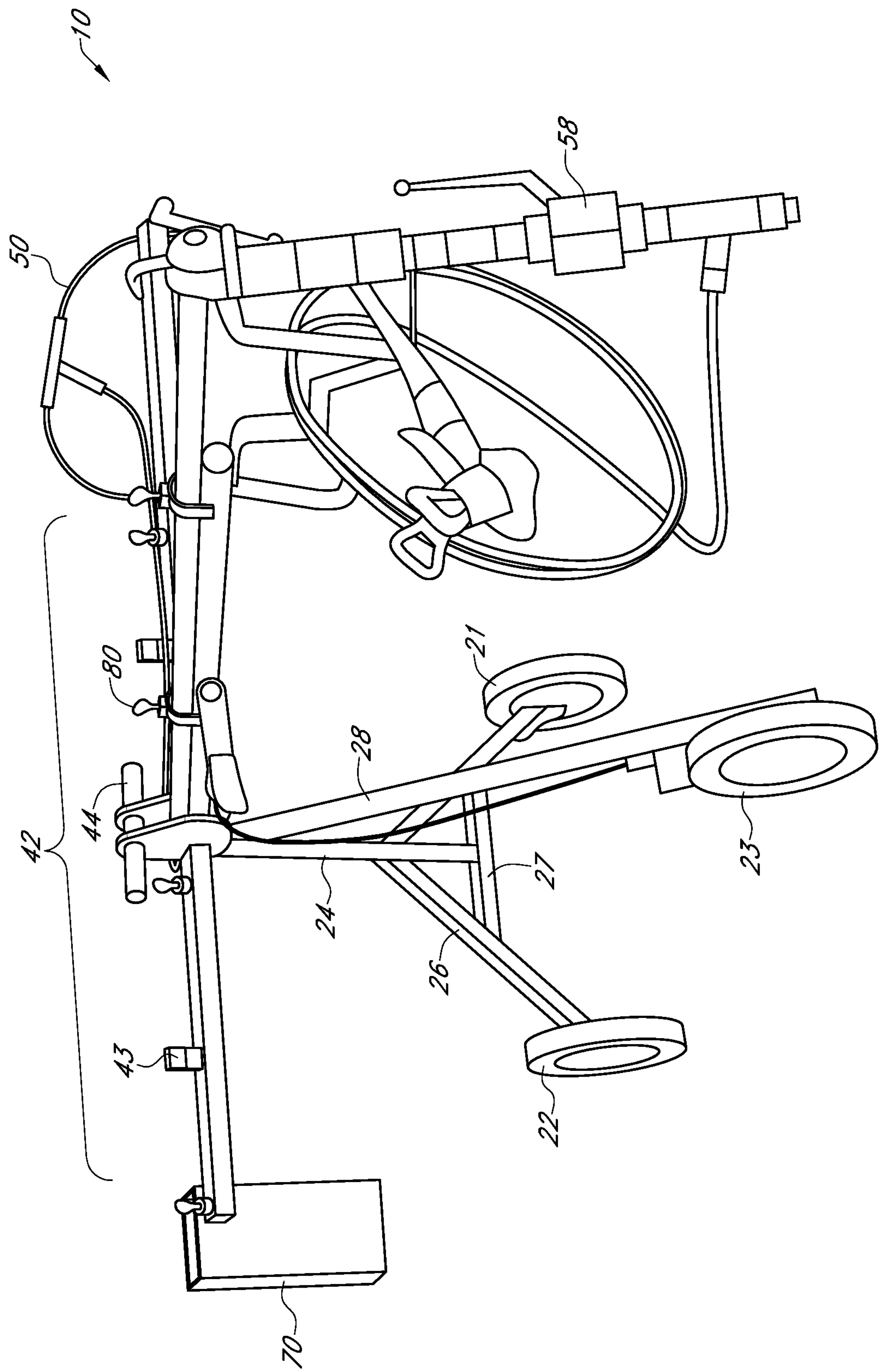
FIG. 3 is a rear perspective view of a coating applicator providing detailed disclosure of the handle, carriage and hose assemblies as disclosed herein.
Figure 4:
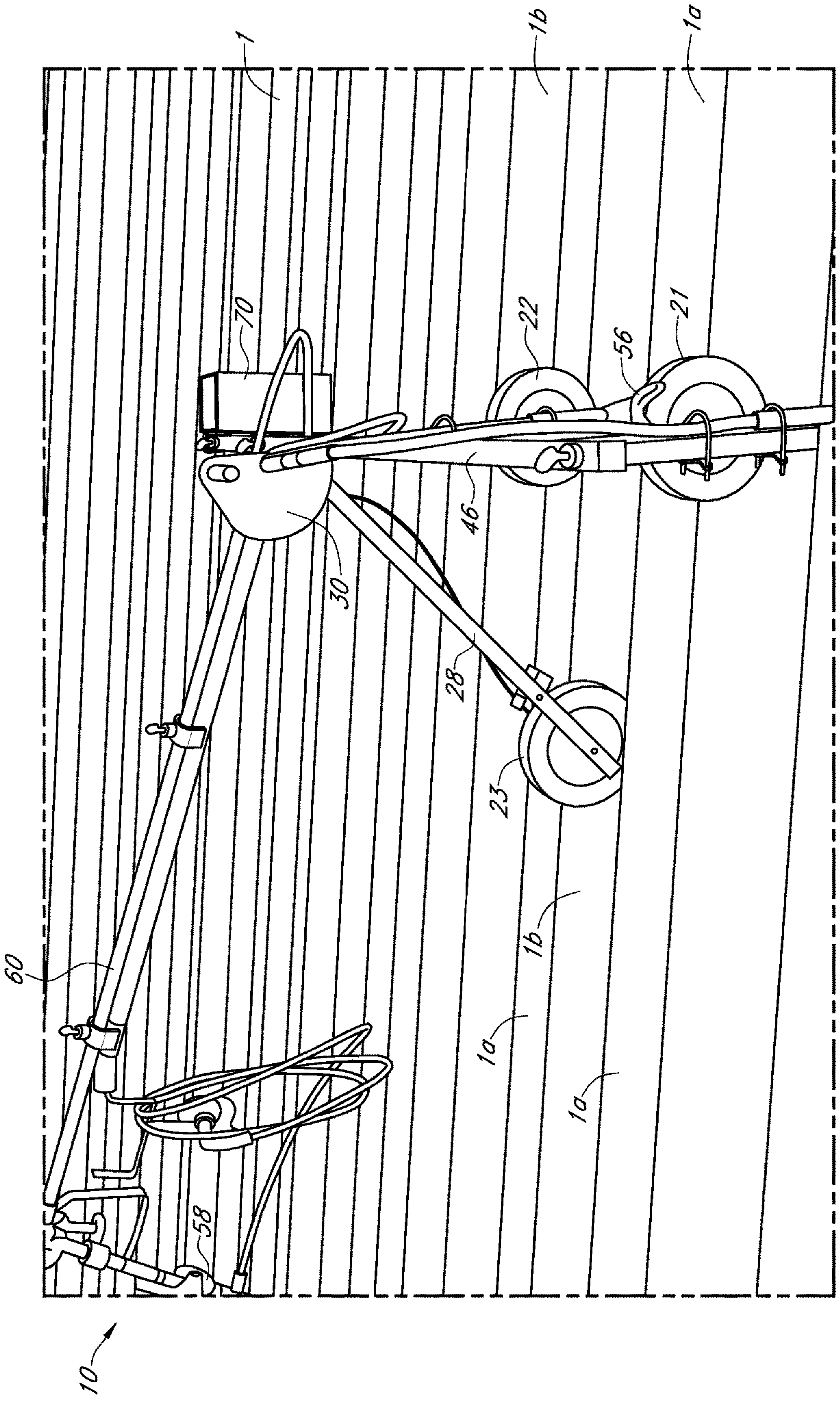
FIG. 4 is a right-side perspective view of the applicator providing detail on the handle, carriage and central support assembly as disclosed herein.
Figure 5:
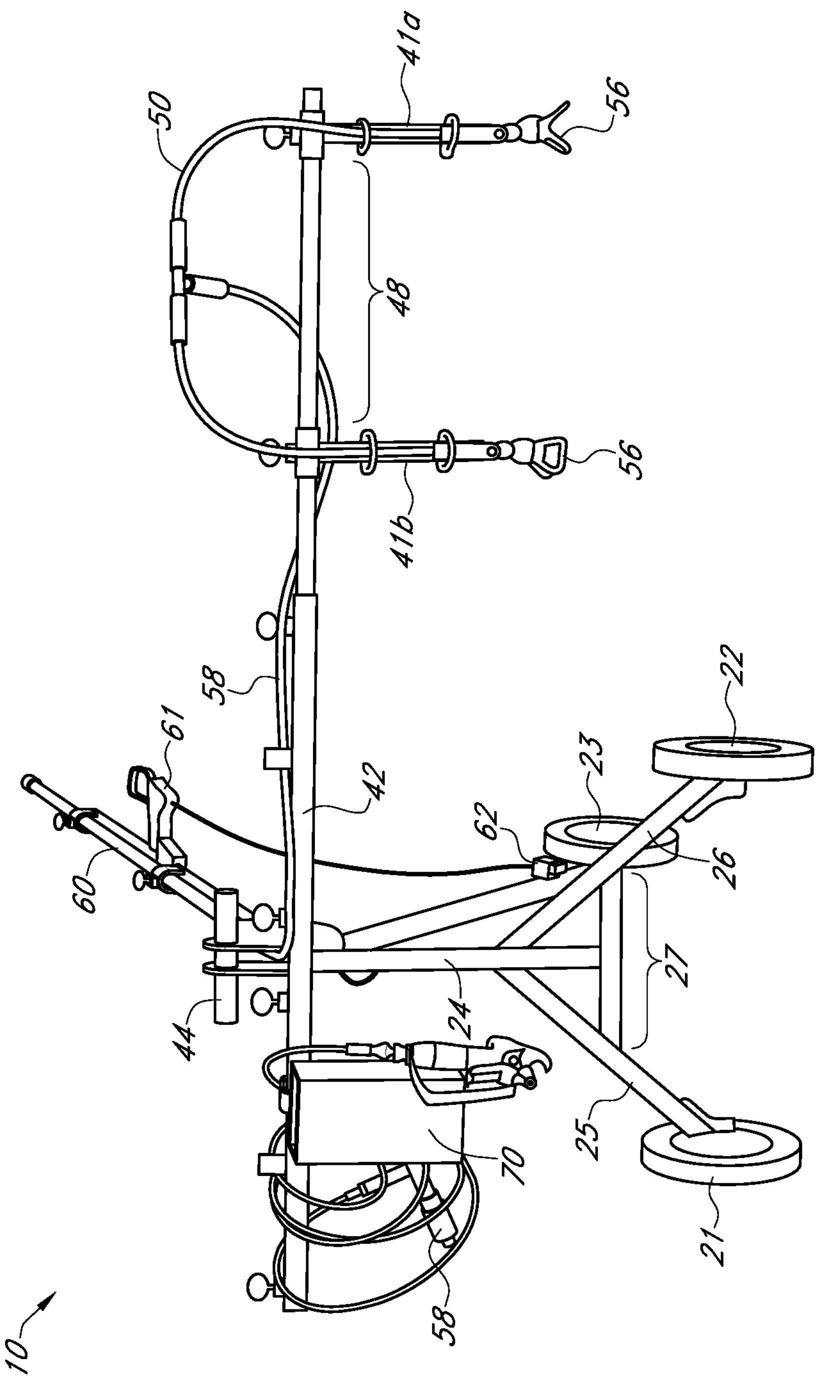
FIG. 5 is a perspective view of the front of the applicator with the spray nozzles attached to the left side of the boom.
Figure 6:
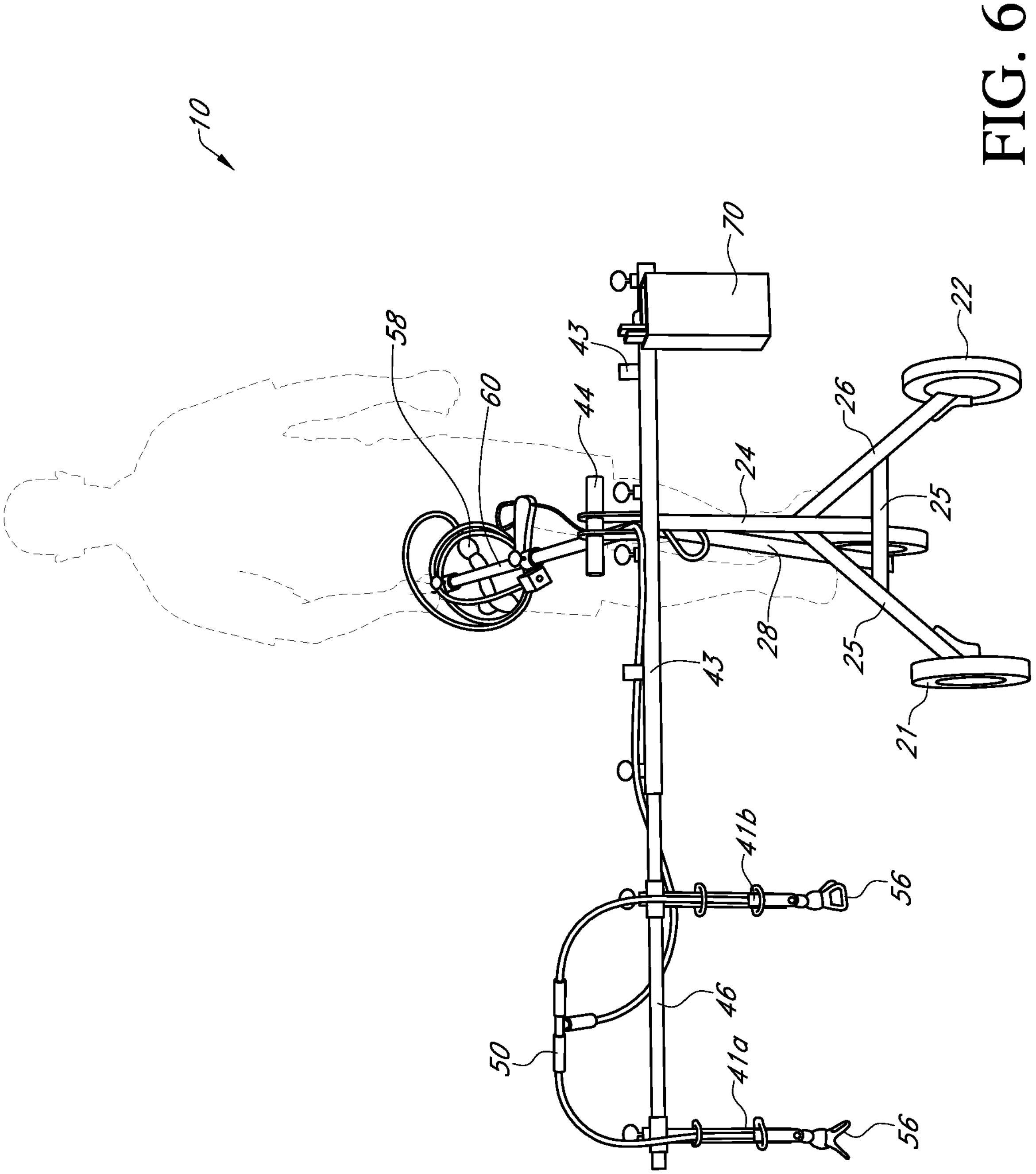
FIG. 6 is a perspective view of the front of the applicator with the spray nozzles attached to the right side of the boom.

The present disclosure relates to a coating applicator 10 for use as illustrated in FIGS. 1-6 applying a coating 2 to a surface 1. FIG. 1 is a rear view of a coating applicator 10 wherein the boom 40 is offset to the right side of the coating applicator 10 in relation to the operator 3 as shown and disclosed herein. As disclosed herein, the coating applicator may be used for at least three (3) coating chemistries including acrylics, urethanes and silicones. As suitable to a particular application, the coating applicator may be configured to work with for high pressure 7250 psi and low pressure 4,000 psi set-ups, required by a particular coating material. FIG. 2 is a perspective view at 45 degrees to the right of the view as shown in FIG. 1 providing additional detail of the carriage 20, the center support assembly 30 and the boom 40. As shown in FIGS. 1, 2 and 4, the surface 1 to be coated may be configured with ridges 1*a* and grooves 1*b* (corrugated) in a repeating parallel pattern across surface 1. FIG. 3 is a rear perspective view of a coating applicator 10 providing detailed disclosure of the handle 60, the carriage 20 and the fluid conduit 54 configured as a hose assembly in the present embodiment. FIG. 4 is a right-side perspective view of the coating applicator 10 providing detail on the handle 60, the carriage 20 and the central support assembly 30 as disclosed herein. As shown, the coating applicator 10 is configured with the carriage 20, the boom 40, the center support assembly 30, the handle 60 and the fluid delivery arrangement 50. The carriage 20 is configured with a center leg 24, a first leg 25, a second leg 26, a center strut 27 and a third leg 28. The first leg 25 is configured to engage with a first wheel 21. The second leg 26 is configured to engage with a second wheel 22. The third leg 28 is configured to engage with a third wheel 23. The first wheel 21 and the second wheel 22 are mounted in a tricycle type arrangement with the third wheel 23 positioned behind and between both the first wheel 21 and the second wheel 22. The first wheel 21 and the second wheel 22 are in-line with each other and are mounted under the boom 40. The first leg 25 and the second leg 26 of the carriage 40 forms a frame of the coating applicator 10 and provides support to the boom. The third leg 28 and the third wheel 23 provide the structural support of the coating applicator 10. The third wheel 28 is positioned under and in-line with the handle 60 wherein the handle 60 is perpendicular to the boom 40 as shown in FIGS. 1-4. As shown in FIGS. 1, 2 and 4, the first wheel 21, the second wheel 22 and the third wheel 23 are configured to engage with and roll on the grooves 1*b* across surface 1. (See also FIGS. 10A-10B) FIG. 5 is a perspective view of the front of the coating applicator 10 with the spray nozzles 56 attached to the left side of the boom 40. FIG. 6 is a perspective view of the front of the coating applicator 10 with the spray nozzles 56 attached to the right side of the boom 40. As shown in FIGS. 5 and 6, the boom 40 is mounted upon the carriage 20 and is configured to engage with at least one nozzle 56 for coating or paint delivery (spraying). The boom 40 is configured with a center section 42, a first section 46 and a second section 48 wherein the center section 42 of the boom 40 is fixable while the first section 46 and the second section 48 of the boom 40 are adjustable. The center section 42 of the boom 40 is fixable while the first section 46 and the second section 48 are adjustable and slidable. The position of the first section 42 of the boom 40 is further defined as the right side of the handle 60 of the coating applicator 10 from the operator's view (as shown in FIG. 6). The position of the second section 48 of the boom 40 is further defined as the left side of the handle 60 of the coating applicator 10 from the operator's view (as shown in FIG. 5). Dependent on the particular application, the operator can adjust and slide either the first section 46 or the second section 48 toward the center section 42 of the boom 40. As the first section of the boom 40 is being pushed to slide toward the center section 42, the second section 48 of the boom 40 is being pushed to slide out of the boom 40, away from the center of the coating applicator 10. The length of the first section 46 of the boom 40 may be telescoped in relation to the center section 42 of the boom 40. The nozzle 56 may be detached from the first section 46 and attached to the second section 48 for fluid delivery (spraying or coating application) on the surface 1 or the area where the second section 48 is positioned above. As the second section 48 of the boom 40 is being pushed to slide toward the center section 42, the first section of the boom 46 is being pushed to slide out of the boom, away from the center of the coating applicator. The length of the second section 48 of the boom may be telescoped in relation to the center section 42 of the boom. The nozzle(s) 56 may be detached from the second section 48 and attached to the first section for fluid delivery (spraying or coating application) on the surface 1 or the area where the first section 46 is positioned above. The center section 42 may have multiple pin holes 43 for engaging and securing the fluid delivery arrangement along the length of the boom 40.

Another important feature of the embodiment is a center support assembly 30. In one embodiment, the center support assembly 30 is configured to engage and attach to the boom 40 and the carriage 30 via welding. The center support assembly 30 is configured with a handle slot and a wheel slot wherein the handle slot is designed for the engagement and attachment of the handle and the wheel slot.

Figure 7:
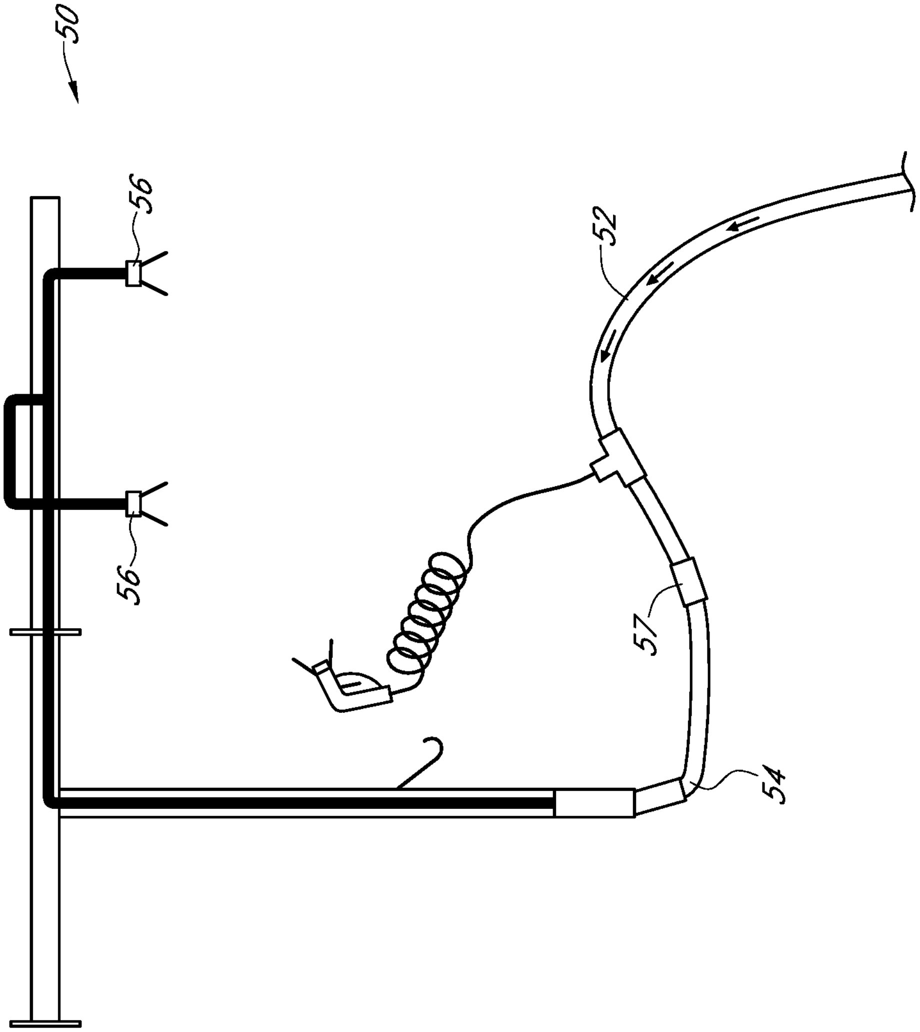
FIG. 7 is a simple schematic flow diagram of the pressurized fluid delivery system for applicator.
Figure 8:
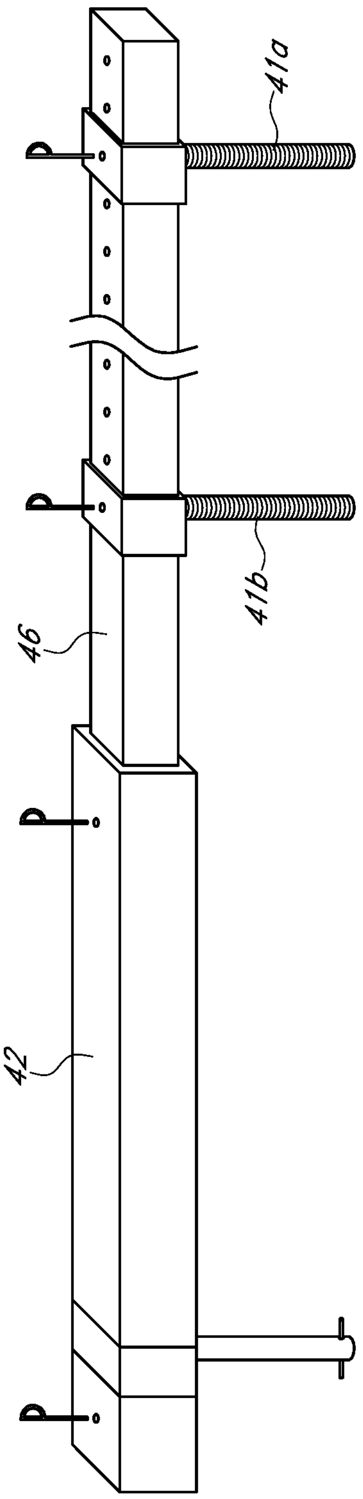
FIG. 8 is a detailed view of the center section of the boom and the telescoping section of the boom.

FIG. 7 is a schematic flow diagram of the fluid delivery arrangement 50 for the coating applicator 10 wherein the fluid delivery arrangement 50 is affixed to the boom 40 of the coating applicator 40. As shown, the fluid delivery arrangement is configured with an input coupling 52, a fluid conduit 54 and at least one nozzle 56. At the handle 10, a pipe if used to deliver the pressurized fluid down the length of the handle to the flexible hose 54 connected to the nozzles 56 which are affixed to either the first or second section of the boom (46, 48). One of ordinary skill will appreciate that choice of valve, couplings, hoses and pipes may be used interchangeably on the coating applicator 10 without departure from the spirit of invention as these elements are well known in the prior art. The input coupling 52 is configured to allow connection with a pressurized fluid delivery system, which is not shown but is well known to one ordinary skill. For purposes of illustration and without restriction or limitation, the coating applicator 10 may be used with a Graco 933 spraying system with 2.5 gal/min @ 6000 psi of capacity made by Graco.[1] These systems are generally known and referred to as hydraulic driven "air less" pumps and provide the actual pressurized fluid (coating or paint material) for application. The fluid conduit is configured for fluid communication with the input coupling 52 at a first end or inlet, which is shown as ball valve 57. See FIG. 3. The nozzle 56 is configured to deliver a pressurized fluid to a surface 1, which may be a roof or a ground surface, without limitation or restriction, as suitable for a particular application. The nozzle 56 is attached to the boom 40 and is in fluid communication with the fluid conduit 54 which is shown as hose assembly. See FIG. 1 and FIG. 7. One of ordinary skill will appreciate that nozzle(s) 56 may be chosen as required and suitable for a particular application. In at least illustrative embodiment, the nozzle(s) 56 were comprised of Graco RAC X Airless Spray Gun ⅞" Tip Guards and Graco RAC X Reversible Airless Switch Tips, both manufactured by Graco and widely available.[2] FIG. 8 is a detailed view of the center section 42 of the boom and the telescoping section of the boom. As shown, the width of the boom may be adjusted. As shown, a pin with multiple holes positioned in the spray boom allow for adjustment, extension, contraction and or telescoping of the boom to ensure the nozzle(s) 56 are properly positioned for delivery of the paint or other coating to the application surface.

[1] https://therofrabbitcart.com/shop/.

Figure 9A:
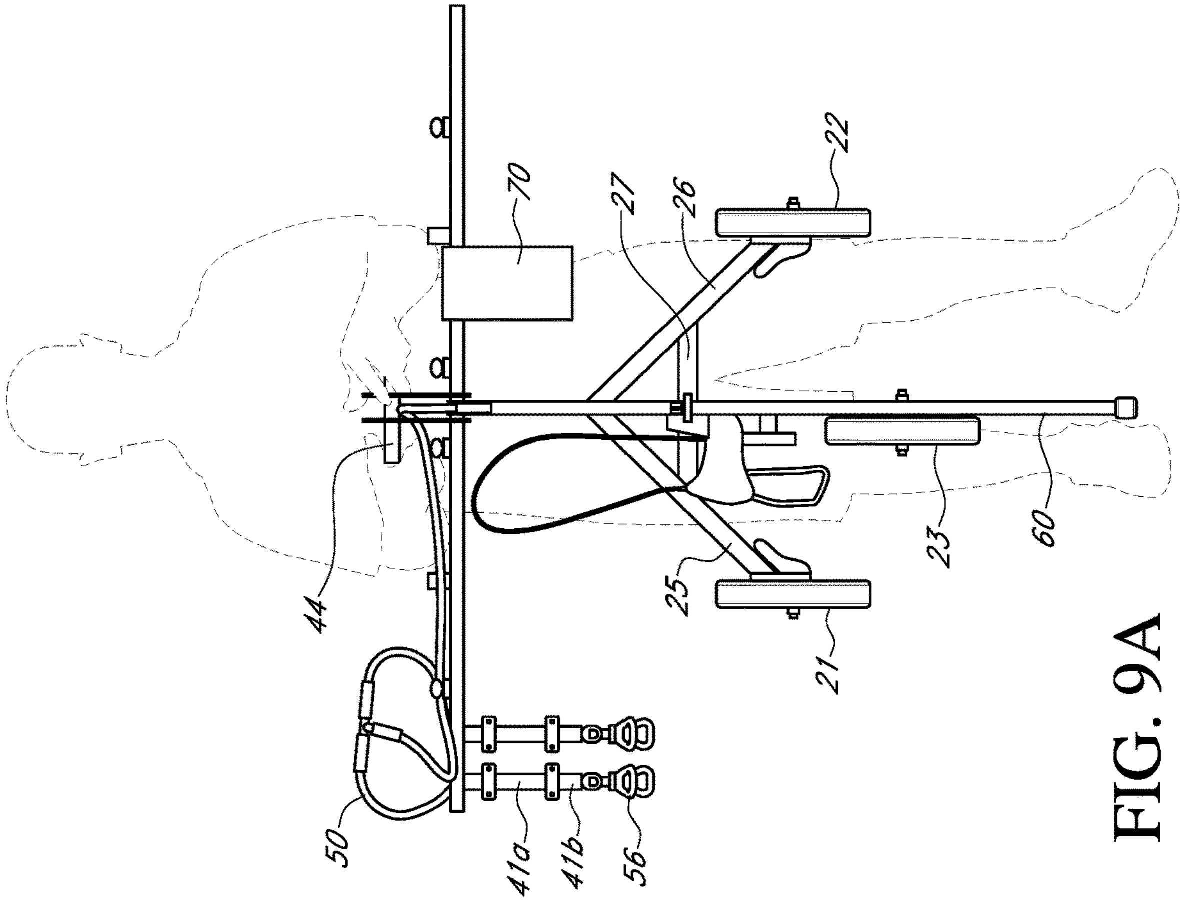
FIG. 9A is a front perspective view of the coating applicator in the collapsed position.
Figure 9B:
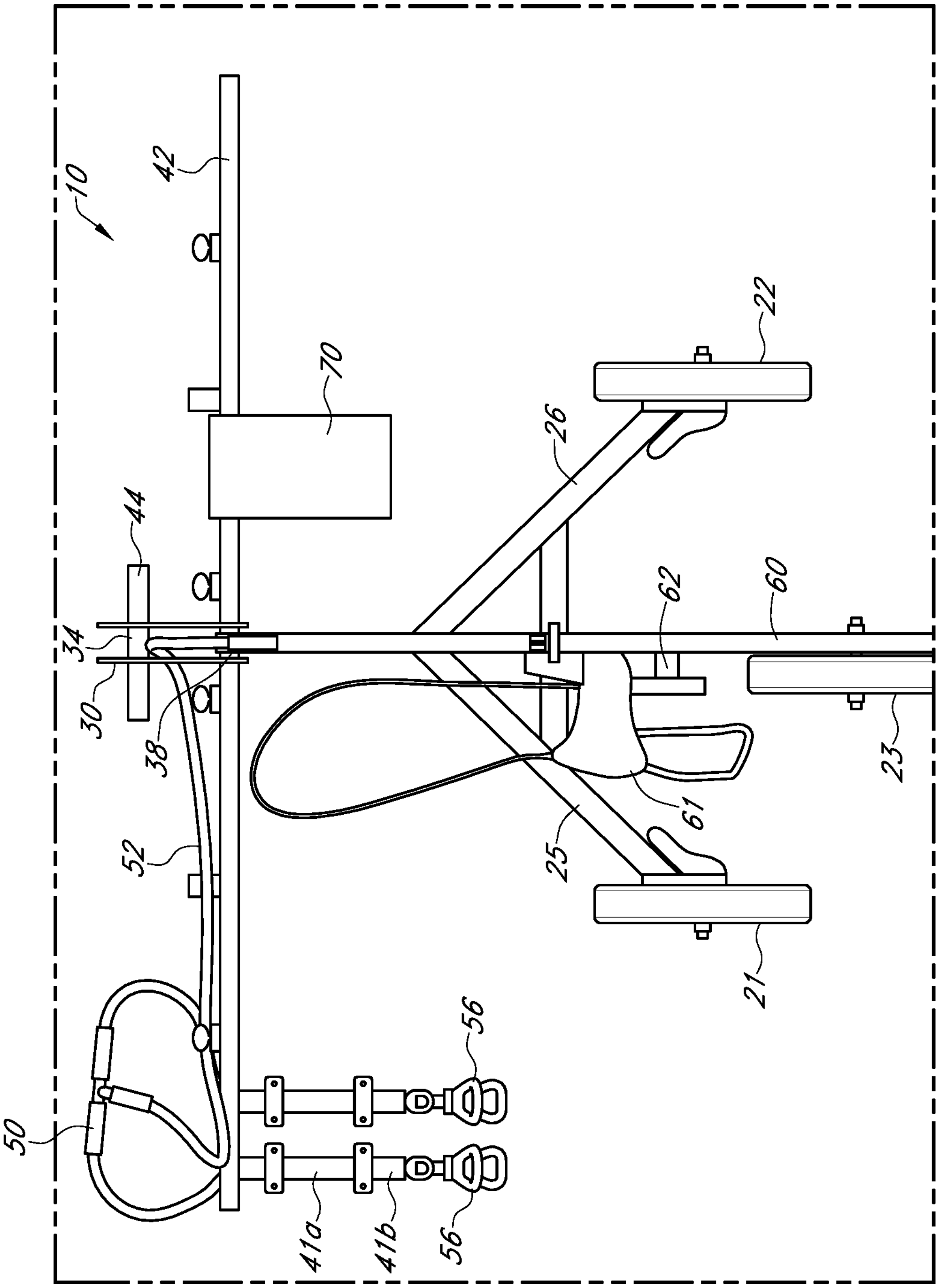
FIG. 9B is a top view of the coating applicator in the collapsed position.

[2] https://www.portlandcompressor.com/store/graco-rac-x-airless.paint-sprayer-tips-ltx-switchtips FIG. 9A is a front perspective view of the coating applicator 10 in the collapsed position. FIG. 9B is a top view of the coating applicator 10 in the collapsed position. As shown, the carriage 20 may be folded entirely or only a portion therein. The arm of the third wheel may be folded or telescope, as required by a particular application. Further, dependent on the particular configuration, the rear (third) wheel allows parking of the unit while in the standing position which is useful when doing detailed coating work. The third wheel allows reduces the weight of the sprayer frame that must be carried vs. rolled again improving the user experience and reducing fatigue. A handle, which may be adjustable, may be positioned between the sprayer frame and the undercarriage. At least one benefit of the adjustable handle 60 allows for ergonomically correct positioning with users to reduce back pain and stress.

Figure 10A:
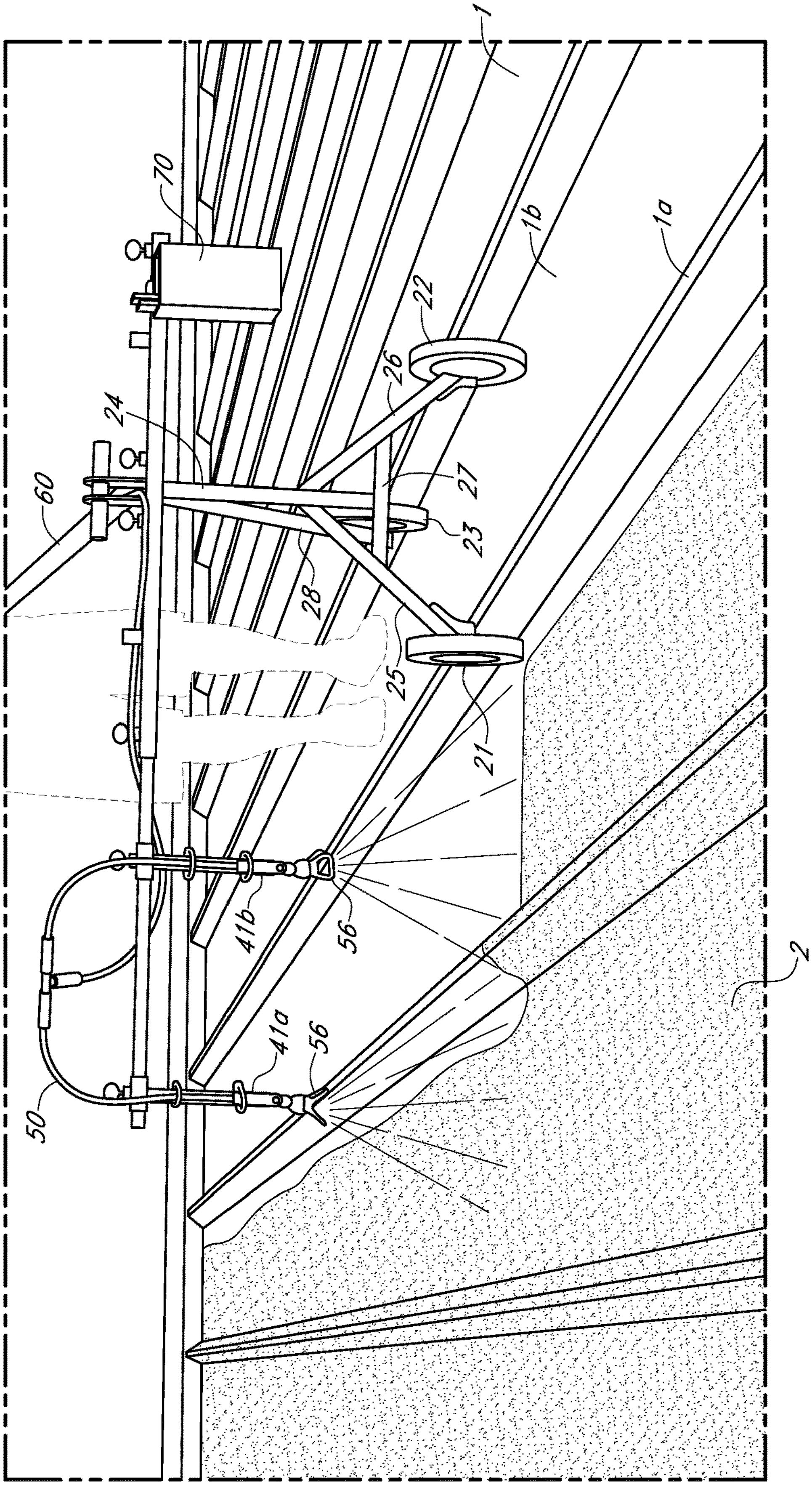
FIG. 10A is a perspective view of the applicator being pulled (moving backward) during operation.
Figure 10B:
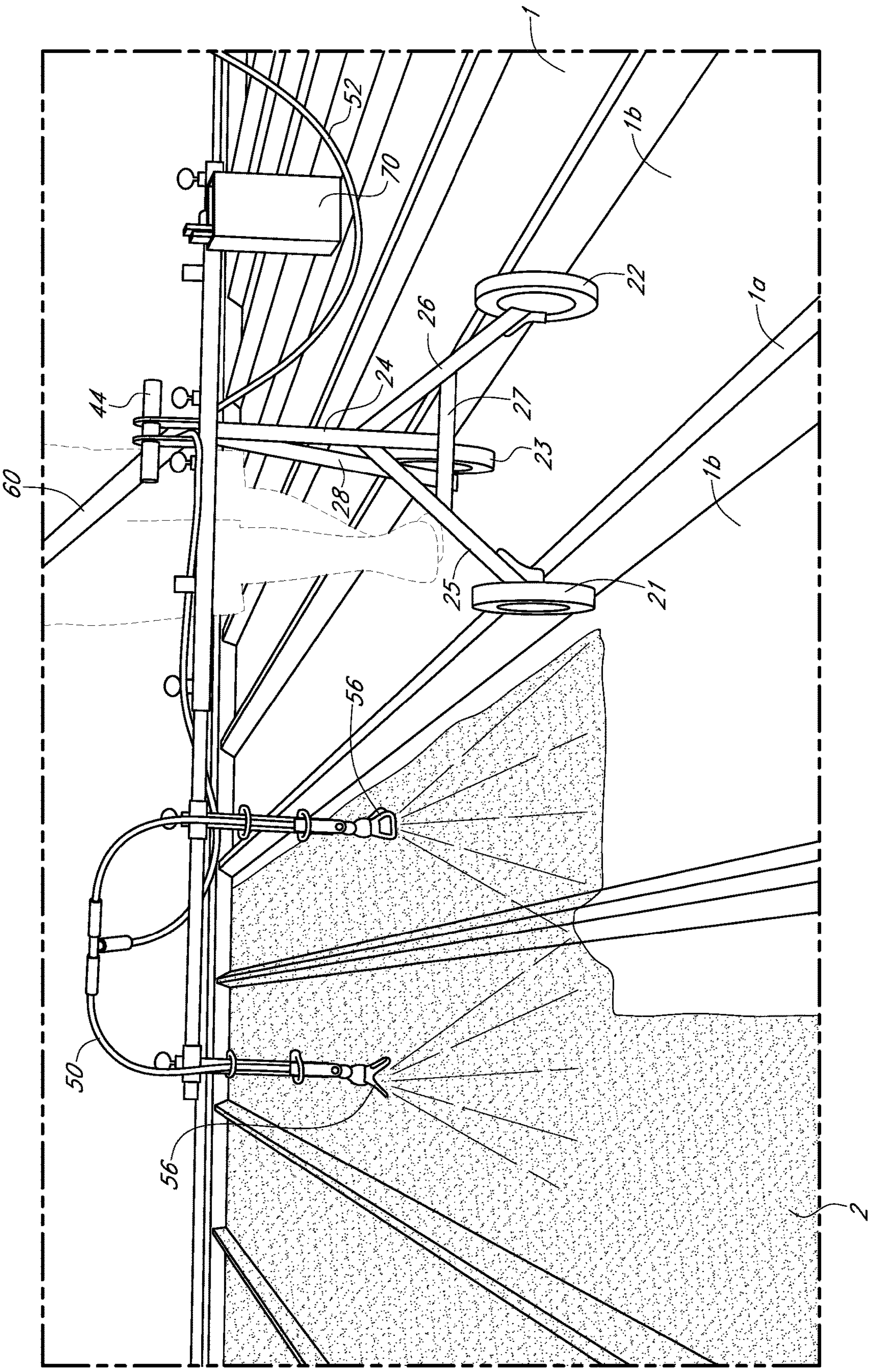
FIG. 10B is a perspective view of the applicator being pushed (moving forward) during operation.

FIG. 10A is a perspective view of the applicator 10 being pulled (moving backward) during operation. FIG. 10B is a perspective view of the applicator 10 being pushed (moving forward) during operation. As shown in FIGS. 10A and 10B, the spacing of the first wheel 21 and the second wheel 22 of the applicator 10 are configured to roll on the grooves 1*b* between the ridges 1*a* across surface 1. As shown, the third wheel 23 is configured to engage with and roll on the groove 1*b* across surface 1.

Additional features included a built in "T" handle (transport handle 61) allowing the coating applicator 10 to be pulled-up and lowered down and moved while in use on the roof. As shown through-out the present application, the left-hand and right-hand orientation of the booms are easily configured and reconfigured. As disclosed, the nozzle 56 placement as well as the adjustable tip angles are easily adjustable. The nozzle 56 heights stay constant during operation so product mil thickness remains more consistent further improving application. The forward orientation of the coating application and the method of its use always keeps the operator working in a facing position to roofs edge so reduced issues of fall hazards. The built-in counterweight doubles as a tool holder. Additional detail gun attachment allows for field and detail work to be done in one trip. The five (5) degree forward camber allows spraying slightly in front of wheels so the coating applicator stays on the roof without rolling over the edge. The combination of users arm length, length of the handle, & forward camber allow unit to be used to roofs edge yet user never breaks OSHA 6' Warning/safety line ruling. Subject to particular application, and paired with the correct pump, the coating applicator may be upgraded to allow up to four (4) tips and a 64" pass.

Description of an Illustrative Method of Using the Coating Applicator

Figure 11A:
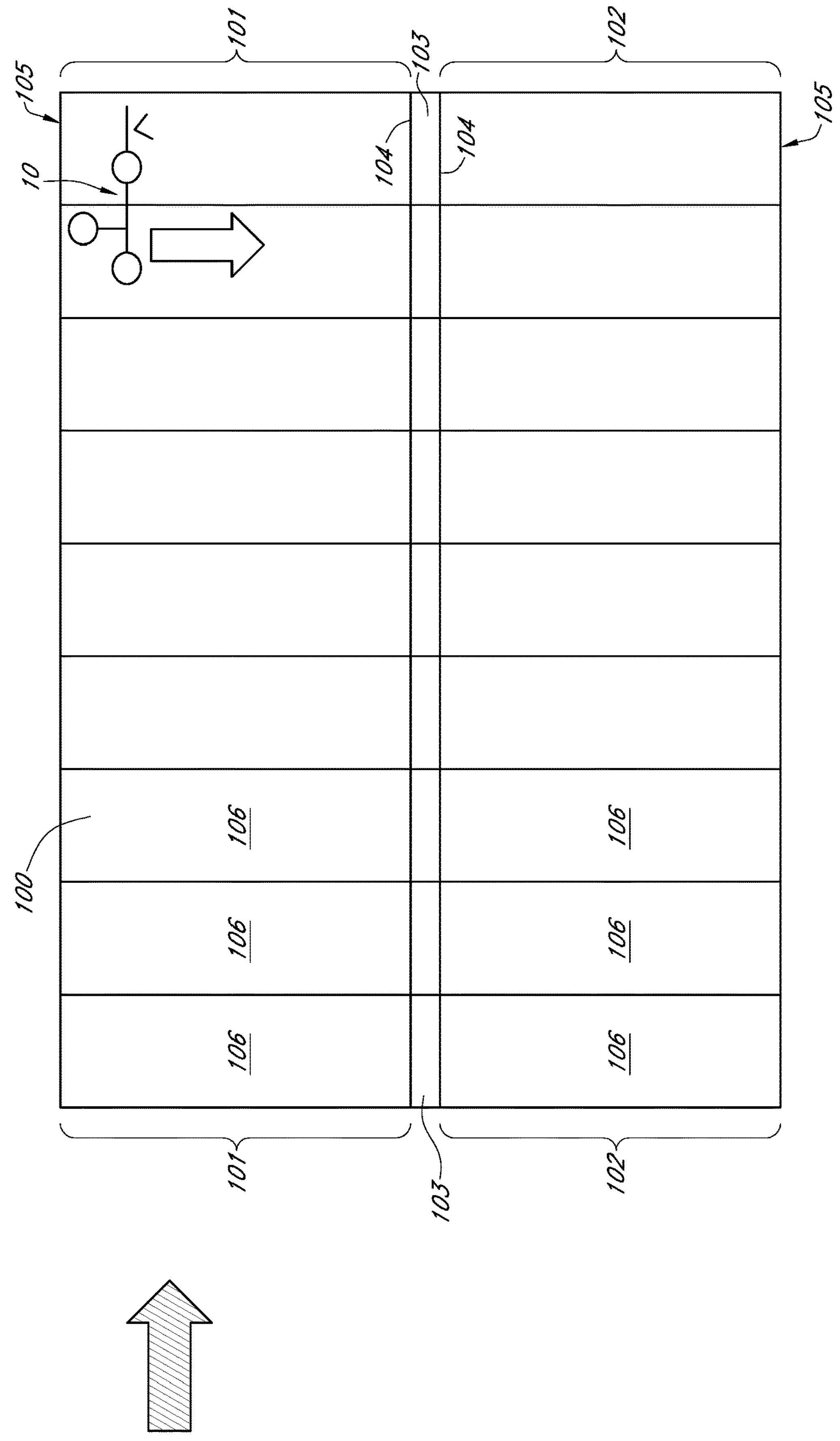
FIG. 11A is a simple view of the coating applicator illustrated as three wheels (three circles) and coating application pathway wherein the operator paints the last row of the surface first.
Figure 11B:
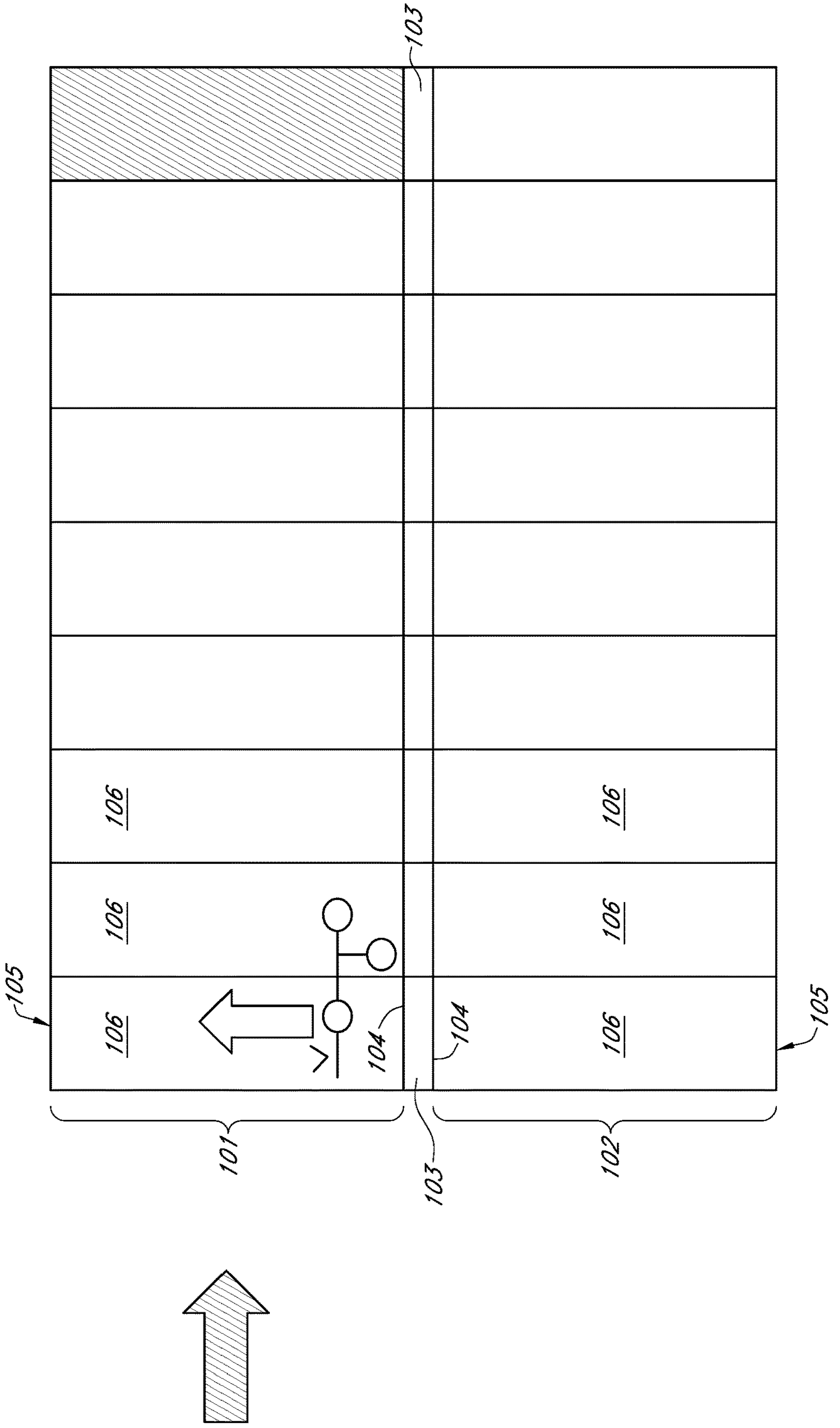
FIG. 11B is a simple view of the coating applicator illustrated as three wheels (three circles) and coating application pathway wherein the coating applicator is being pushed.
Figure 11C:
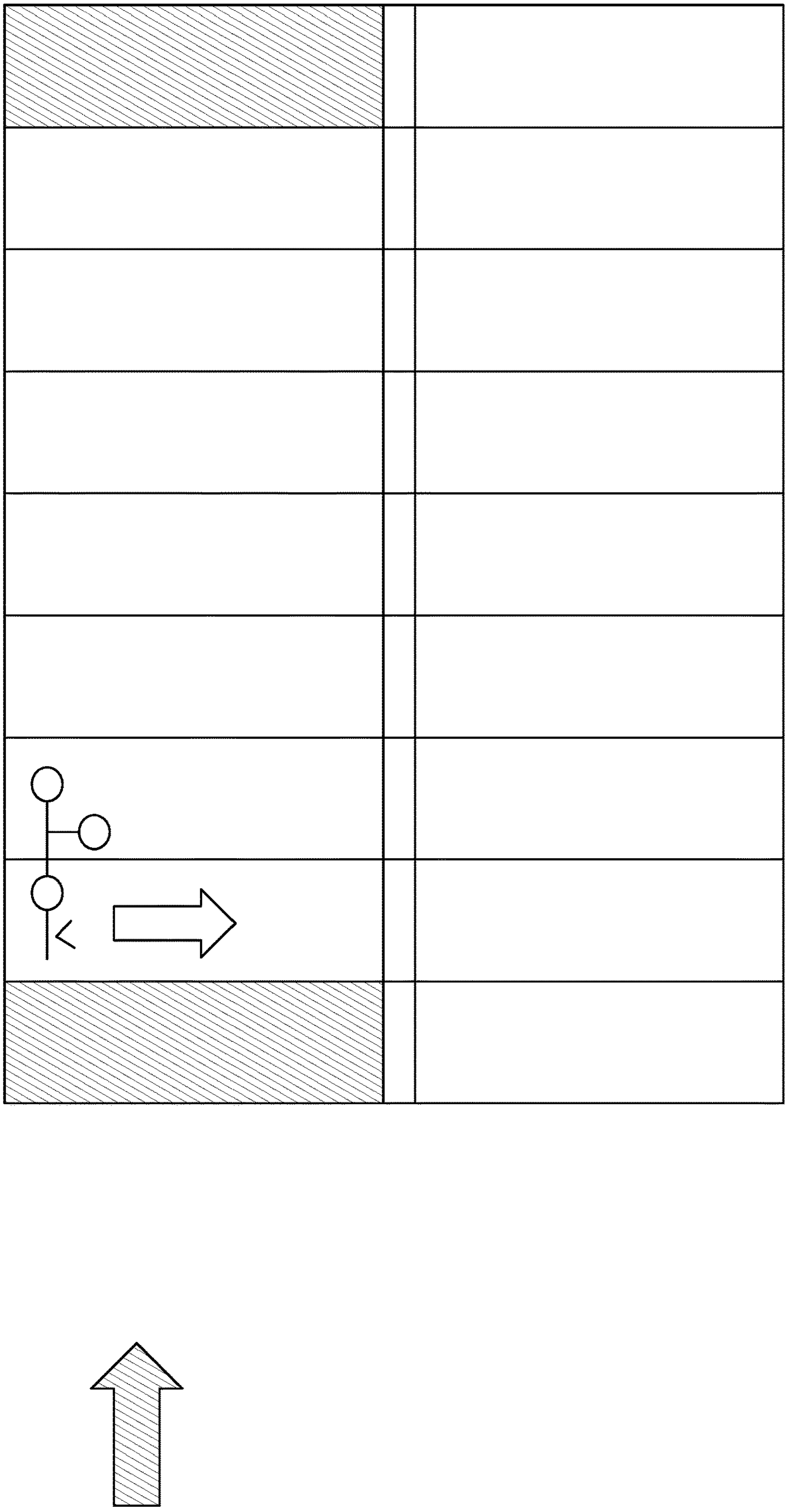
FIG. 11C is a simple view of the coating applicator illustrated as three wheels (three circles) and coating application pathway wherein the coating applicator is being pulled.
Figure 11D:
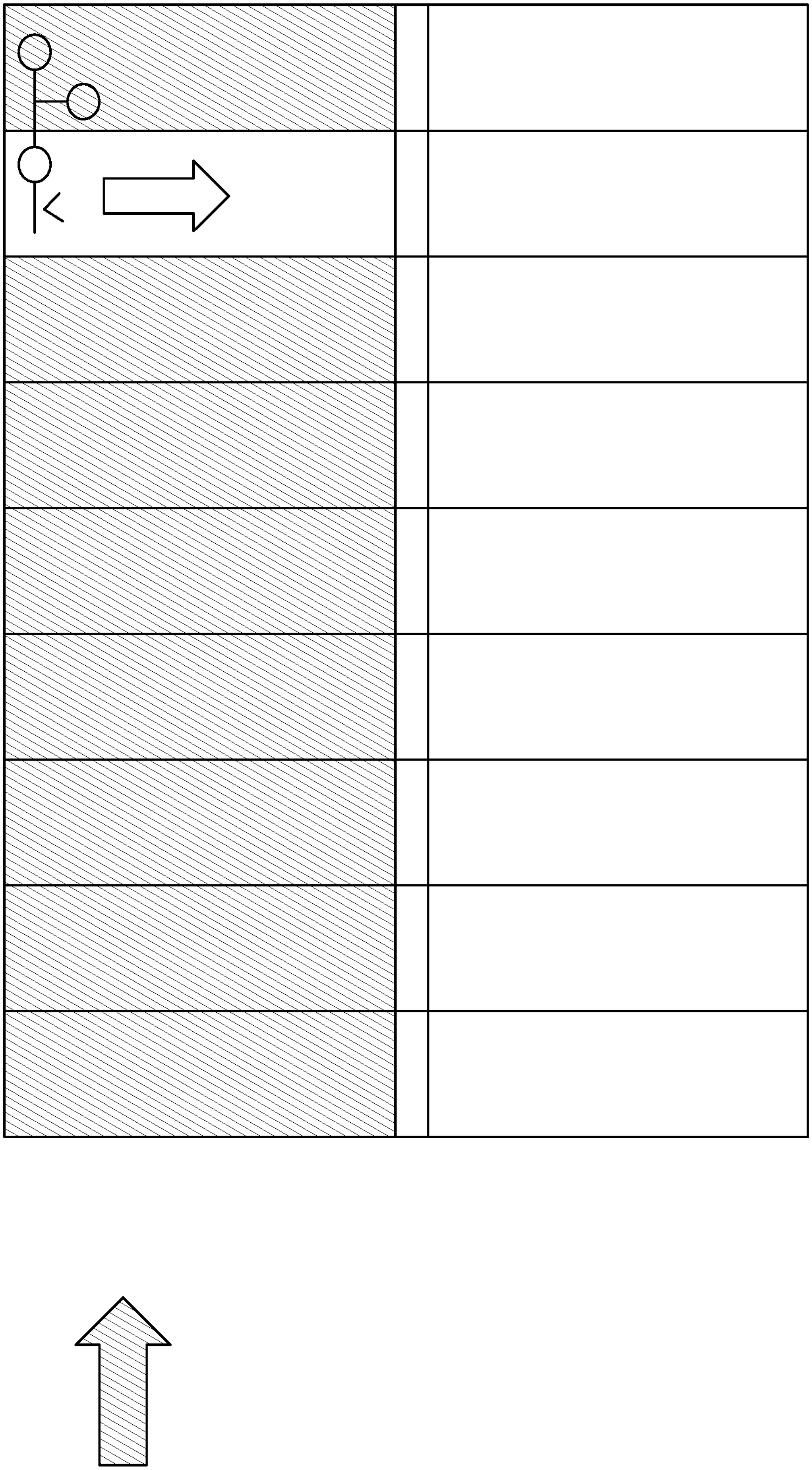
FIG. 11D is a simple view of the coating applicator illustrated as three wheels (three circles) and coating application pathway wherein the coating applicator is travelling at the end of the profile.

Another aspect of the present embodiment is the method of operating the coating applicator as shown and illustrated in FIGS. 11A-11G. FIG. 11A is a simple view of the coating applicator 10 illustrated as three wheels (three circles) and coating application pathway wherein the operator paints the last row of the surface first. As disclosed, one use of the coating applicator 10 is for coating a standing seam rib roof 100 and includes positioning a coating applicator 10 on a standing seam rib roof 100 having a rib 103 dividing the standing seam rib roof 100 into a first area 101 and a second area 102, the rib 103 having a first end and second end, the coating applicator 10 positioned initially proximate a first end of the rib 103. The standing seam roof is further defined by the ends being either edges 105 or eves 104. FIG. 11B is a simple view of the coating applicator illustrated as three wheels (three circles) and coating application pathway wherein the coating applicator is being pushed from the rib 103 to the eve 104. FIG. 11C is a simple view of the coating applicator illustrated as three wheels (three circles) and coating application pathway wherein the coating applicator is being pulled. The eves are positioned at the ends of the multiple panels 106 positioned across the areas (101, 102) of the roof 100. The edges 105 are positioned at either end of the rib 103 which may bisect the roof as shown in FIGS. 11A-11G. The coating applicator 10 is connected to a pressurizing fluid supply source, typically not located on the roof, to provide pressurized coating material 2 to the coating applicator 10. Then the coating 2 may be applied to a first panel 106 of the first area 101 of the standing rib roof in a first direction from the rib 103 to an eve 104 of the roof with the coating applied on a panel adjacent a first edge of the first area, the second section of the applicator configured with at least one nozzle for application of the coating. (See also FIG. 10B illustrating the operator pushing the coating applicator 10.) FIG. 11D is a simple view of the coating applicator illustrated as three wheels (three circles) and coating application pathway wherein the coating applicator is travelling at the end of the profile. The coating applicator is then repositioned to a next panel 106 adjacent the first panel of the first area of the standing rib roof 100 by lifting it up (not shown but understood) and moving it over as illustrated by FIGS. 11A-11D. The coating is then applied to the next panel in a second direction from the eve to the rib of the roof by reversing the direction of the applicator, without rotating the coating applicator 10. (See also FIG. 10A illustrating the operator pulling the coating applicator 10.) Progress is made coating the surface of the roof from the first end of the rib to the second end by repeating the applying step and then the repositioning steps until reaching the second end of the rib having applied coating to all panels of the first area as illustrated by FIG. 11D.

Figure 11E:
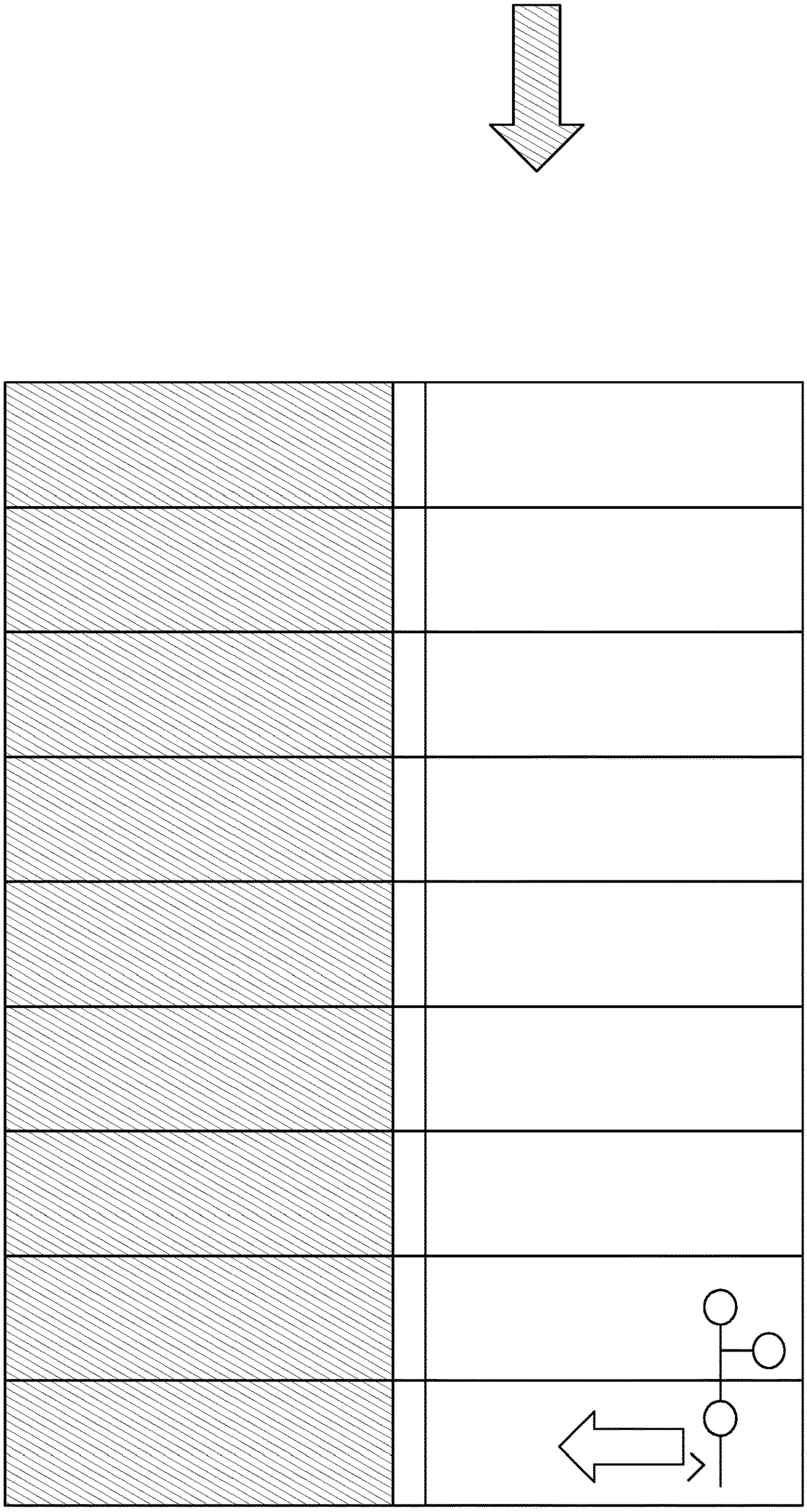
FIG. 11E is a simple view of the coating applicator illustrated as three wheels (three circles) and coating application pathway of the opposite side wherein the operator paints the last row of the surface first.
Figure 11F:
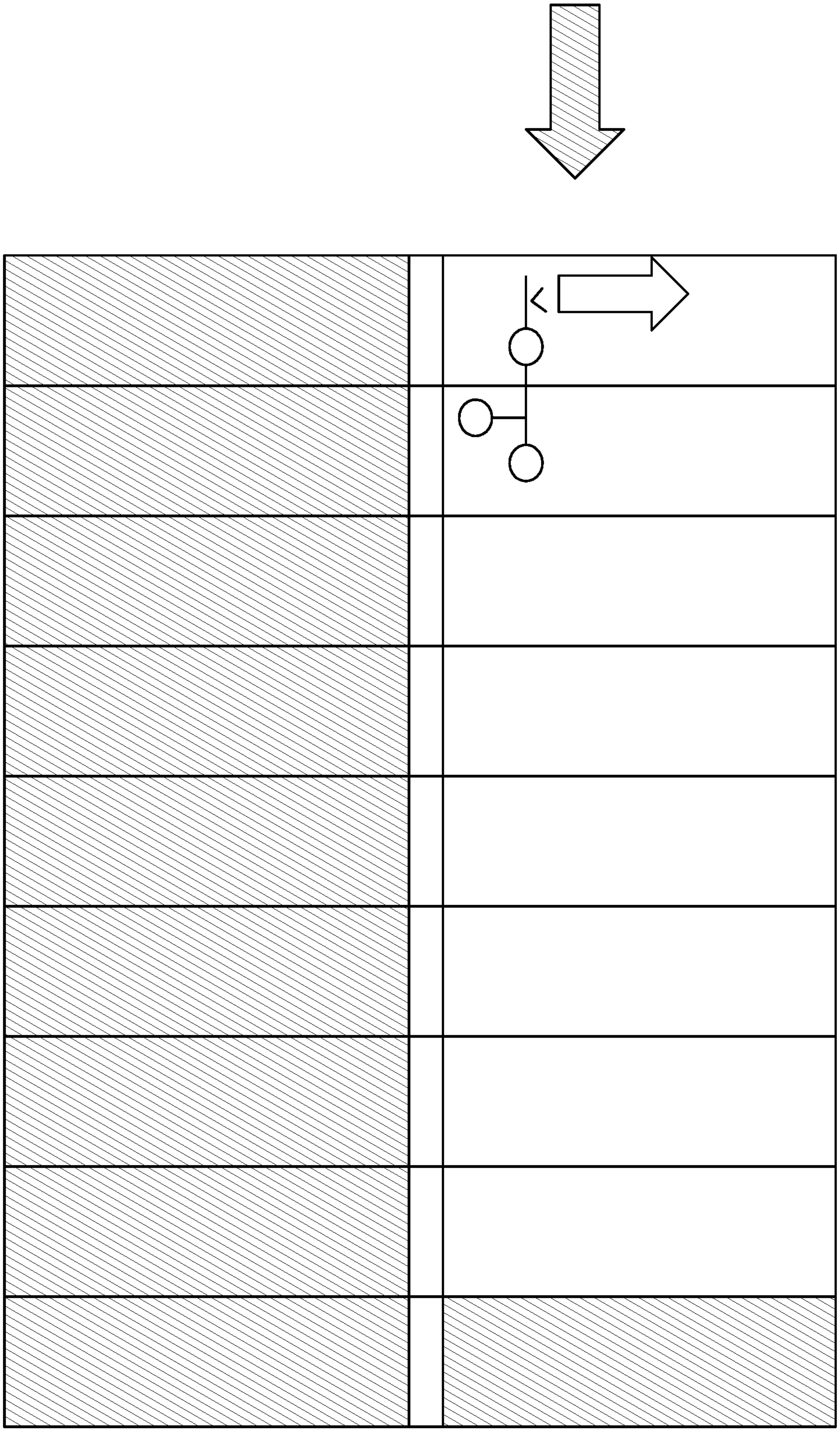
FIG. 11F is a simple view of the coating applicator illustrated as three wheels (three circles) and coating application pathway of the opposite side wherein the coating applicator is being pushed.
Figure 11G:
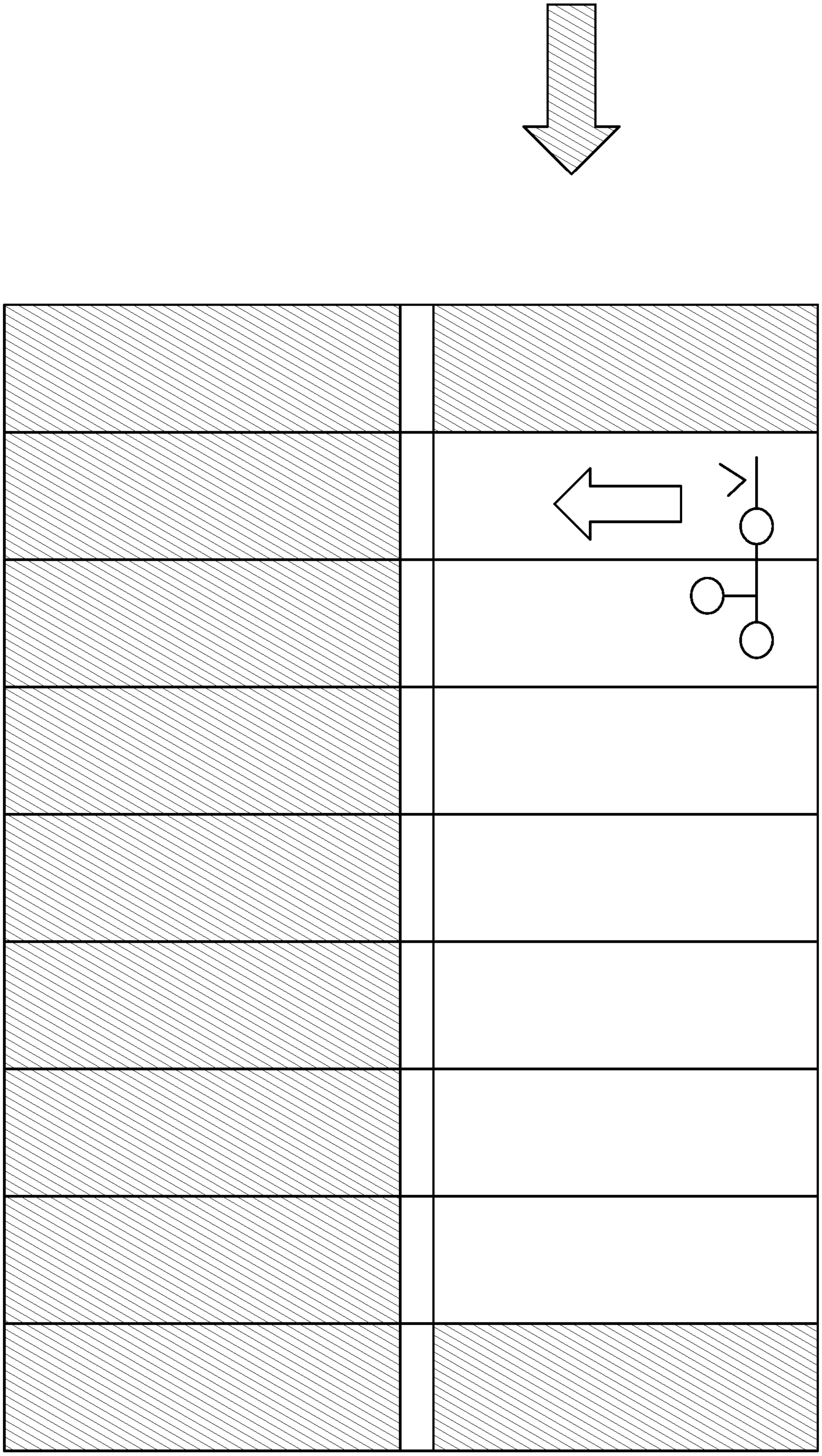
FIG. 11G is a simple view of the coating applicator illustrated as three wheels (three circles) and coating application pathway of the opposite side wherein the coating applicator is being pulled.
Figure 11H:
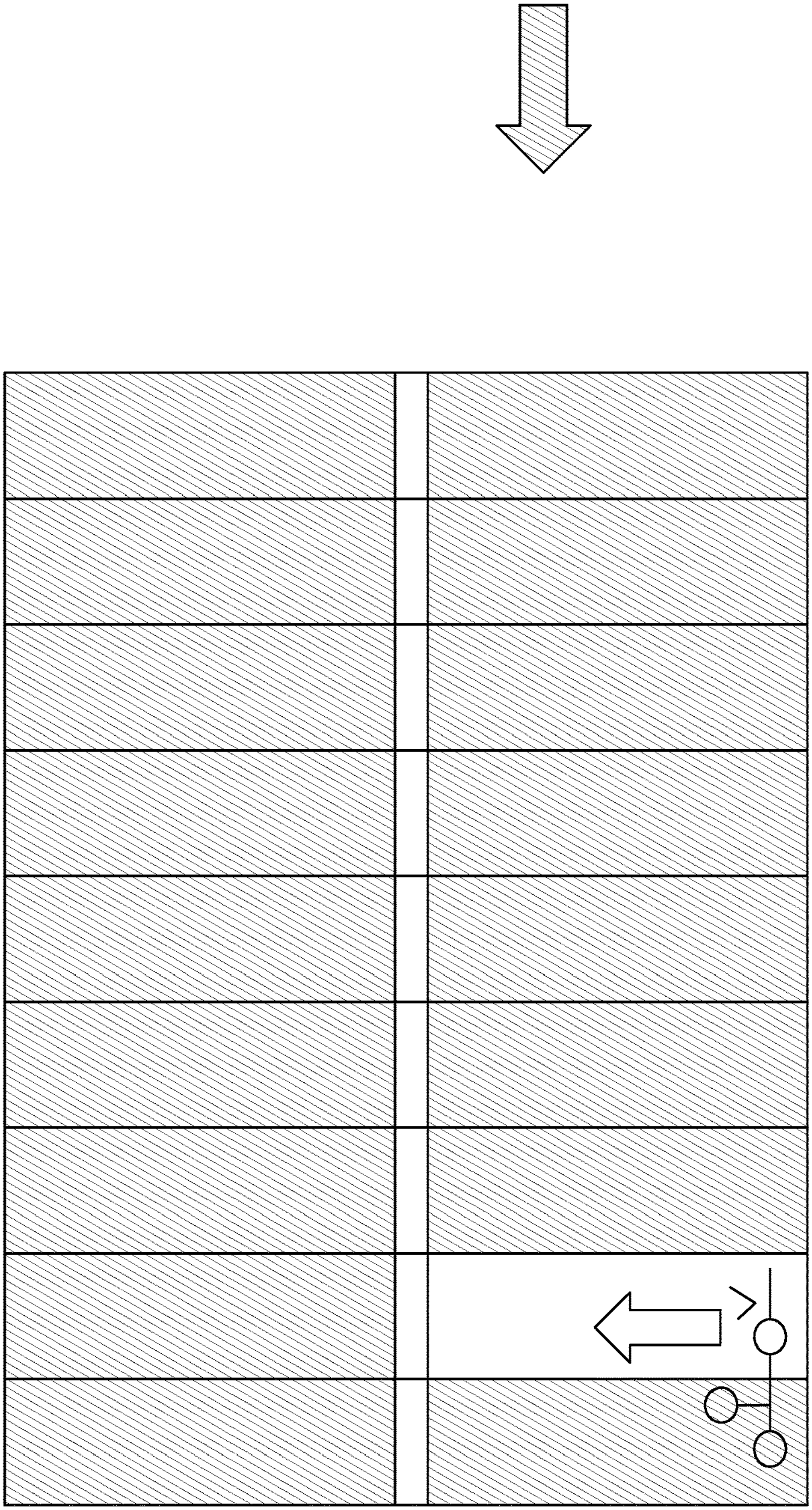
FIG. 11H is a simple view of the coating applicator illustrated as three wheels (three circles) and coating application pathway of the opposite side wherein the coating applicator is travelling at the end of the profile.

FIG. 11E is a simple view of the coating applicator illustrated as three wheels (three circles) and coating application pathway of the opposite side wherein the operator paints the last row of the surface first. FIG. 11F is a simple view of the coating applicator illustrated as three wheels (three circles) and coating application pathway of the opposite side wherein the coating applicator is being pushed. FIG. 11G is a simple view of the coating applicator illustrated as three wheels (three circles) and coating application pathway of the opposite side wherein the coating applicator is being pulled. FIG. 11H is a simple view of the coating applicator illustrated as three wheels (three circles) and coating application pathway of the opposite side wherein the coating applicator is travelling at the end of the profile. The method of using the coating applicator to coat a standing seam rib roof is then applied by repositioning the coating applicator over the rib onto the second area and rotating the coating applicator 180 degrees for placement on the first panel adjacent an edge of the second area of the roof, proximate the second end of the rib as illustrated by FIG. 11E. The coating is then applied to a first panel of the second area of the standing rib roof in a first direction from the rib to an eve of the roof with the coating applied on a panel adjacent a first edge of the second area. (See FIGS. 11E-11G) The coating applicator is repositioned to a next panel adjacent the first panel of the second area of the standing rib roof with coating application continuing to the next panel in a second direction from the eve to the rib of the roof by reversing the direction of the applicator, without rotating the coating applicator. Similar to the first area, progress in repeating the applying step and then the repositioning steps until reaching the first end of the rib having applied coating to all panels of the second area is illustrated in FIGS. 11F-11H. In practice one of ordinary skill will appreciate that the operator 3 may choose to use the detail gun 58 to coat the first panel of the first area and the last panel of the second area (shown in FIGS. 11A-11H) to allow the operator a dry coated surface for the first pass and the last pass creating an entry path and an exit path for completion of the coating application on the entire area.

The following detailed description is of the best currently contemplated modes of carrying out illustrative embodiments of the invention. The description is not to be taken in a limiting sense, but is made merely for the purpose of illustrating the general principles of the invention, since the scope of the invention is best defined by the appending claims. Various inventive features are described below herein that can each be used independently of one another or in combination with other features.

While certain specific embodiments have been described in detail, it is understood that the present disclosure will be appreciated by those skilled in the art and will be developed considering the overall teaching of the disclosure. Accordingly, the embodiments disclosed herein should not be construed as limitation on the scope of the invention, but should be determined by the appended claims and their legal equivalents.

As one of ordinary skill will appreciate the present disclosure is not limited by the means of construction or the materials chosen as other suitable materials, including plastic, steel or aluminum, and combinations therein.

It should be noted that particular embodiment are not limited to the specific embodiments pictured and described herein, but is intended to apply to all similar apparatuses and methods for providing the various benefits of those elements, which such benefits are explicitly and/or inherently disclosed herein. Modifications and alterations from the described embodiments will occur to those skilled in the art without departure from the spirit and scope of the coating applicator. Furthermore, variations and modifications of the foregoing are within the scope of the sprayer system. It is understood that the coating applicator as disclosed herein extends to all alternative combinations of one or more of the individual features mentioned, evident from the text and/or drawings, and/or inherently disclosed. All of these different combinations constitute various alternative aspects of the coating applicator and methods of using. The embodiments described herein explain the best modes known for practicing the coating applicator and will enable others skilled in the art to utilize the same. The claims are to be construed to include alternative embodiments to the extent permitted by the prior art.

Having described preferred aspects of the various methods and apparatuses, other features of the present disclosure will undoubtedly occur to those versed in the art, as will numerous modifications and alterations in the embodiments as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure and/or components thereof unless so indicated in the following claims. Furthermore, the methods and embodiments pictured and described herein are no way limiting to the scope of the present disclosure unless so stated in the following claims.

Any dimensions provided herein are for illustrative purposes only and in no way limit the scope of the present disclosure unless so indicated in the following claims. It should be noted that the present disclosure and/or components thereof are not limited to the specific embodiments pictured and described herein, but are intended to apply to all similar apparatuses and methods for providing a predictive design analysis in a virtual environment. Modifications and alterations from the described embodiments will occur to those skilled in the art without departure from the spirit and scope of the present disclosure.

Any of the various features, components, functionalities, advantages, aspects, configurations, etc. for the present disclosure may be used alone or in combination with one another depending on the compatibility of the features. Accordingly, a nearly infinite number of variations of the present disclosure exists. Modifications and/or substitutions of one feature, component, functionality, aspect, configuration, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the present disclosure has been described in connection with preferred aspects and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. A coating applicator comprising:

a) a carriage having a triangular shape comprising:
   i. a center leg having a first end, a center portion and a second end;
   ii. a first leg having a first end and a second end, the first end of the first leg joined with the center portion of the center leg and the second end having a first wheel affixed therein;
   iii. a second leg having a first end and a second end, the first end of the second leg joined to the center portion of the center leg and the second end having a second wheel affixed therein, wherein the first wheel and the second wheel are positioned opposite each other;
   iv. a third leg having a first end and a second end, the second end having a third wheel affixed therein;

b) a center support assembly, wherein the center support assembly is mounted above and to the carriage at the second end of the center leg and wherein the first end of the third leg is joined to the center support assembly;

c) a boom having a center section, a first section, and a second section, wherein the boom is mounted on the center support assembly;

d) a handle, the handle configured to engage with the center support assembly and to control a direction of travel of the applicator during use and the third wheel is aligned with the handle and positioned behind the first wheel and the second wheel;

e) a fluid delivery arrangement, the fluid delivery arrangement further comprising:
   i. an input coupling, the input coupling to allow connection with a pressurized fluid delivery system;
   ii. a fluid conduit having at least a first end and a second end, the fluid conduit in fluid communication with the input coupling at the first end;
   iii. at least one nozzle configured for delivery of a pressurized fluid to a surface positioned adjacent the at least one nozzle, wherein the at least one nozzle is attachable to the boom and is in fluid communication with the second end of the fluid conduit; and, f) the fluid delivery arrangement is affixed to at least the boom of the applicator.

2. The coating applicator according to claim 1 wherein the first section of the boom is adjustable in a horizontal direction in relation to the center section of the boom.

3. The coating applicator according to claim 1 wherein the second section of the boom is adjustable in a horizontal direction in relation to the center section of the boom.

4. The coating applicator according to claim 1 wherein the first wheel and second wheel are in-line with each other and mounted under the boom, and the third wheel is positioned under and in-line with the handle, the handle perpendicular to the boom.

5. The coating applicator according to claim 1 wherein a length of the first section of the boom may be telescoped in relation to the center section of the boom.

6. The coating applicator according to claim 1 wherein a length of the second section of the boom may be telescoped in relation to the center section of the boom.

7. The coating applicator according to claim 1 wherein at one least one brake is engageable with at least one wheel of the carriage to hold the position of the applicator.

8. The coating applicator according to claim 7 wherein the at least one brake is controllable from the handle to hold the position of the applicator.

9. The coating applicator according to claim 1 wherein the pressurized fluid system is fluidly connected to the applicator and not attached to or integral with the applicator.

10. The coating applicator according to claim 1 wherein a power source is connectable to at least one of the three wheels to drive the applicator.

11. The coating applicator according to claim 1 wherein a windscreen is attachable to the applicator to reduce overspray from the at least one nozzle during coating operations.

12. The coating applicator according to claim 11 wherein the windscreen is attached to the boom of the applicator.

13. The coating applicator according to claim 1 wherein the carriage and the handle may be adjustable and movable from a first position to a second position to allow the applicator to be collapsible for compact transport.

14. The coating applicator according to claim 1 wherein the first section is configured as a tube which is adjustable in position via slidable engagement with the center section of the boom which is also configured as a tube.

15. A coating applicator for applying coatings to a standing seam rib roof comprising:

a) a center support assembly, wherein the center support assembly is mounted above and to a carriage, the carriage having a triangular shape and further comprising:
   i. a center leg having a first end and a second end;

ii. a first leg having a first end and a second end, the first end of the first leg joined with the center leg and the second end having a first wheel affixed therein;

iii. a second leg having a first end and a second end, the first end of the second leg joined to the center leg and the second end having a second wheel affixed therein, wherein the first wheel and the second wheel are positioned opposite each other;

iv. a third leg having a first end and a second end, the first end joined to the center support assembly and the second end having a third wheel affixed therein;

b) a boom having a center section, a first section, and a second section, wherein the boom is mounted on the center support assembly;

c) a handle, the handle configured to engage with the center support assembly and to control a direction of travel of the applicator during use;

d) a fluid delivery arrangement, the fluid delivery arrangement to deliver a coating further comprising:

i. an input coupling, the input coupling to allow connection with a pressurized fluid delivery system;

ii. a fluid conduit having at least a first end and a second end, the fluid conduit in fluid communication with the input coupling at the first end;

iii. at least one nozzle configured for delivery of a pressurized fluid to a surface positioned adjacent the at least one nozzle, wherein the at least one nozzle is attachable to the boom and is in fluid communication with the second end of the fluid conduit, wherein the fluid delivery arrangement is affixed to at least the boom of the applicator; and, e) the coating applicator is to be positioned on a corrugated standing seam rib roof for applying the coating, wherein the corrugated standing seam rib roof is further defined as having at least one area with at least one ridge and at least one groove adjacent each side of the at least one ridge, wherein the first wheel and the second wheel are positioned to roll in the at least one groove adjacent each side of the at least one ridge.

16. The coating applicator according to claim 15 wherein the first section of the boom is adjustable in a horizontal direction in relation to the center section of the boom.

17. The coating applicator according to claim 15 wherein the second section of the boom is adjustable in a horizontal direction in relation to the center section of the boom.

18. The coating applicator according to claim 15 wherein the first wheel and second wheel are in-line with each other and mounted under the boom, and the third wheel is positioned under and in-line with the handle, the handle perpendicular to the boom.

19. The coating applicator according to claim 15 wherein a length of the first section of the boom may be telescoped in relation to the center section of the boom.

20. The coating applicator according to claim 15 wherein the carriage and the handle may be adjustable and movable from a first position to a second position to allow the applicator to be collapsible for compact transport.

21. The coating applicator according to claim 1 wherein the first end of the center leg is connected to a center strut positioned between and connected to the first leg and the second leg.

22. The coating applicator according to claim 1 wherein the center support assembly is configured with slots to mount the second end of the center leg and the first end of the third leg.

23. The coating applicator according to claim 14 wherein the carriage and the handle may be adjustable and movable from a first position to a second position to allow the applicator to be collapsible for compact transport.

24. The coating applicator according to claim 15 wherein the first end of the center leg is connected to a center strut positioned between and connected to the first leg and the second leg.

25. The coating applicator according to claim 15 wherein the center support assembly is configured with slots to mount the second end of the center leg and the first end of the third leg.

* * * * *